March 17, 1970 W. C. ROESCH 3,501,634
WHOLE-BODY-RADIATION COUNTER WITH MEANS FOR CONTROLLING
THE SCANNING VELOCITY
Filed March 6, 1968
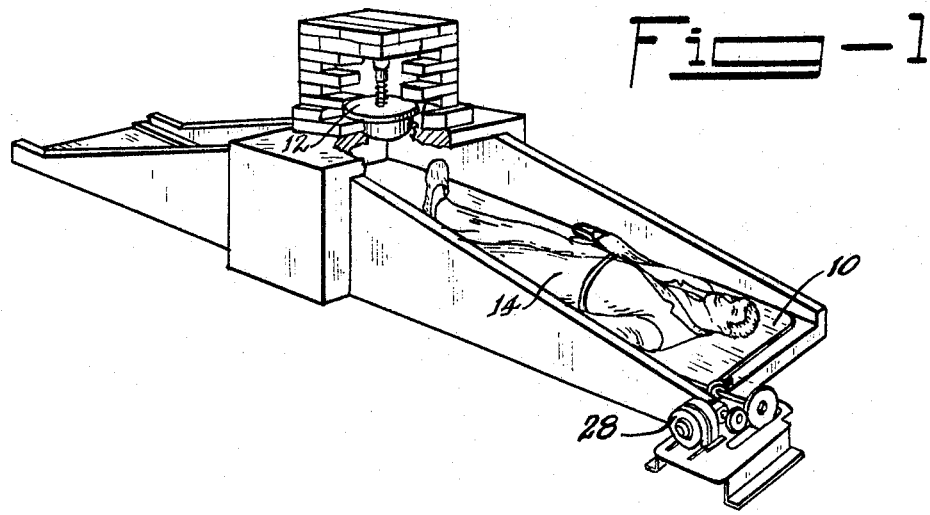
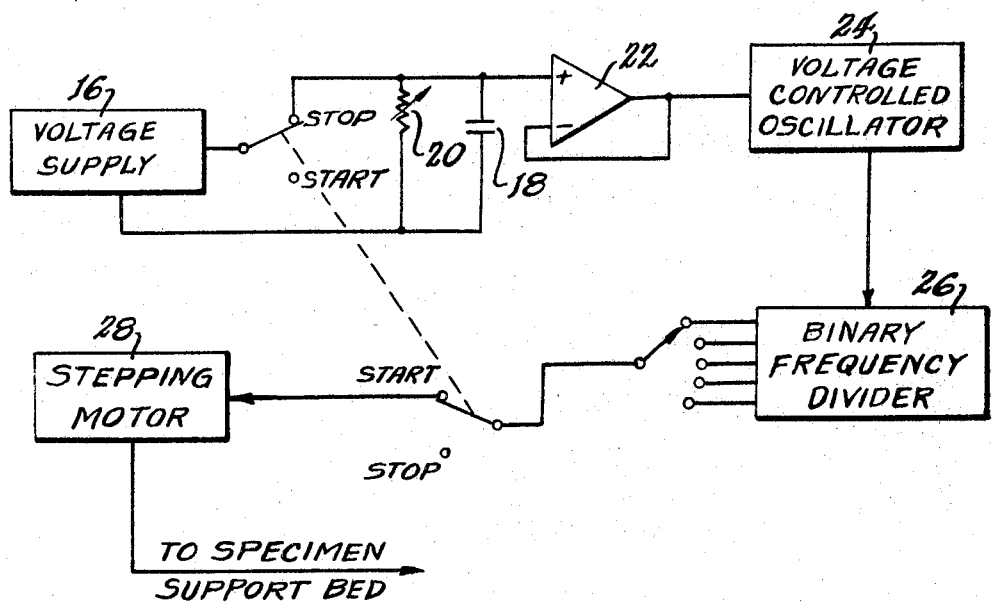
Inventor
William C. Roesch
Attorney

United States Patent Office 3,501,634
Patented Mar. 17, 1970

3,501,634
WHOLE-BODY-RADIATION COUNTER WITH MEANS FOR CONTROLLING THE SCANNING VELOCITY
William C. Roesch, Richland, Wash., assignor to the United States of America as represented by the United States Atomic Energy Commission
Filed Mar. 6, 1968, Ser. No. 710,813
Int. Cl. G01t 1/20
U.S. Cl. 250—52
5 Claims

ABSTRACT OF THE DISCLOSURE

A whole-body-radiation counter includes radiation-counting means and specimen-support means movable with respect to the counting means to provide a whole-body-radiation scan of radionuclides within a specimen mounted on the support means. A resistor-capacitor combination generates a signal decaying in amplitude proportional to $e^{-\lambda t}$, where $e$ is the natural logarithm, $\lambda = .693$ divided by the half-life of the radionuclide being measured and $t$ = time measured from a predetermined reference time. A stepping motor responsive to this signal drives the specimen-support means.

CONTRACTUAL ORIGIN OF THE INVENTION

The invention described herein was made in the course of, or under, a contract with the United States Atomic Energy Commission.

BACKGROUND OF THE INVENTION

This invention relates to radiation-measuring devices and more particularly to devices capable of whole-body-radiation counting. Radiation-measuring devices exist which detect and measure the distribution of radioactive nuclides within the body of a specimen. These radiation-measuring devices are generally known as whole-body-radiation counters. To operate, either the radiation-detecting scintillation crystal or the specimen whose radiation is being measured is moved such that radioactive material at any location in the specimen will pass through the same sequence of positions relative to the scintillation crystal and will be counted with the same efficiency. In general, present devices embody a constant-velocity radiation scan and as such suffer a serious disadvantage when measuring radionuclides whose half-life duration is of the same order of magnitude as the scanning time. In such a situation, the calibration of spectrometer counts per unit activity will vary during the scanning time.

Accordingly, it is one object of the present invention to provide a whole-body-radiation-counting device capable of detecting radionuclides having short half-lives.

It is another object of the present invention to provide an improved whole-body-radiation-measuring device.

Other objects of the present invention will become more apparent as the detailed description proceeds.

SUMMARY OF THE INVENTION

In general, the present device comprises specimen-support means and radiation-counting means. Means are provided for generating a signal proportional to $e^{-\lambda t}$, where $e$ is the natural logarithm, $\lambda = .693$ divided by the half-life of the radionuclide being measured and $t$ = the time measure from a predetermined reference time. Motive means responsive to this signal provide relative motion between the specimen-support means and the radiation-counting means to effect a scan of the radionuclides within the specimen.

BRIEF DESCRIPTION OF THE DRAWINGS

Further understanding of the present invention may best be obtained from the accompanying drawings wherein:

FIG. 1 is a sketch of a whole-body-radiation counter.
FIG. 2 is a schematic diagram of the control apparatus for the counter of FIG. 1.

DESCRIPTION OF THE PREFERRED EMBODIMENT

In FIG. 1, specimen-support bed 10 is movable with respect to a scintillation crystal radiation detector 12 so that for a specimen 14 mounted on the bed 10 a scan may be made thereof so that radioactive material at any body location will pass through the same sequence of positions relative to the scintillation crystal 12 and will be counted with the same efficiency. This structure is that of the conventional whole-body-radiation counter.

For the practice of the present invention the apparatus illustrated in FIG. 2 is used to control the motion of the bed 10 relative to the radiation detector 12. The present invention decreases the scan velocity exponentially as the half-life decay of the radionuclide being scanned, whereby the calibration in terms of counts per unit activity for the specimen 14 is constant with the scanner position. The apparatus of FIG. 2 in accordance with the present invention changes the scanning speed of the specimen 14 below the radiation detector 12 in proportion to $e^{-\lambda t}$, where $\lambda = .693$ divided by the half-life of the radionuclide being detected and $t$ = the time measured from a predetermined reference time.

A voltage supply 16 charges a capacitor 18 to a predetermined voltage $E_A$. The capacitor 18 is connected in parallel with a variable resistor 20. The capacitor 18 and resistor 20 are sized such that $\lambda = 1/RC$, where $\lambda = .693$ divided by the half-life of the radionuclide being measured, R = the value of resistor 20 and C = the capacitor 18. The circuit configuration of resistor 20 and capacitor 18 is such that when the initial charging voltage from supply 16 is removed, the discharge voltage across capacitor 18 will be proportional to $e^{-t/RC}$, where $e$ = the natural logarithm, $t$ = time measured from a predetermined reference time, R = the value of resistor 20 and C = the value of capacitor 18. The voltage output $E_O$ taken across capacitor 18 (equal to $E_A e^{-t/RC}$) is fed via an operational amplifier 22 to a voltage control oscillator 24. The voltage control oscillator 24 produces an output signal whose frequency is proportional to the amplitude of the input voltage applied thereto. The output from the oscillator 24 is fed via a binary frequency divider 26 to a stepping motor 28. The stepping motor is mechanically coupled to the specimen-support bed 10 to control the motion thereof relative to the radiation detector 12. In operation, the supply 16 charges the capacitor 18 to a predetermined initial voltage at which time the voltage supply 16 is removed from capacitor 18. The capacitor-resistor combination will cause the voltage across capacitor 18 to decay at a rate proportional to $e^{-t/RC}$. This decaying voltage is fed through the operational amplifier to the oscillator 24 where an output signal is generated whose frequency is proportional to the amplitude of the decaying voltage across capacitor 18. Since this frequency is generally too high to drive stepping motor 28, it is fed through the frequency divider 26, where its frequency is reduced to provide a nominally desired frequency less than the maximum operating frequency of the stepping motor 28. Thus, a driving signal is provided for the stepping motor 28 proportional to $e^{-\lambda t}$, thereby imparting to the specimen-support bed 10 a motion relative to radiation detector 12 which decreases exponentially with the same half-life as the radionuclide being measured. This provides a calibration in terms of counts per unit activity which will be constant during the scanning time.

It is readily obvious that, though the aforementioned apparatus has been described as imparting motion to the specimen-support bed, the present invention is not to be limited thereto. It may equally be applied to provide motion to the radiation-counting crystal 12 when the specimen-support bed 10 is maintained in a constant position and the crystal scanned with respect thereto.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. In a radiation-measuring system of the class wherein specimen-support means are movable relative to a radiation-counting means to provide a whole-body-radiation scan of a radionuclide of a specimen mounted on said support means, the combination with said specimen-support means of means for generating a first signal proportional in amplitude to $e^{-\lambda t}$, where $e$=the natural logarithm, $\lambda=.693$ divided by the half-life of said radionuclide and $t$=time measured from a predetermined reference time, and drive means coupled to said specimen-support means to impart motion thereto responsive to said generated first signal.

2. The apparatus of claim 1 wherein said first signal-generating means comprise a capacitor, a resistor connected in parallel with said capacitor, said resistor and capacitor having a value such that $\lambda=1/RC$, where $\lambda=.693$ divided by the half-life of said radionuclide, R=the value of said resistor and C=the value of said capacitor, and means for charging said capacitor to a predetermined voltage.

3. The apparatus according to claim 1 wherein said drive means comprise means for generating a second signal whose frequency is proportional to the amplitude of said first signal, a stepping motor, and means for connecting said motor to impart motion to said specimen-support means responsive to the frequency of said second signal.

4. A device for measuring the radiation from radionuclides within a specimen comprising specimen-support means, radiation-counting means, means for generating a first signal proportional to $e^{-\lambda t}$, where $e$=the natural logarithm, $\lambda=.693$ divided by the half-life of said radionuclide and $t$=time measured from a predetermined reference time, and motive means responsive to said first signal for providing relative motion between said specimen-support means and said radiation-counting means to effect a scan of said radionuclide within said specimen.

5. The apparatus according to claim 4 wherein said signal-generating and motive means comprise a resistor, a capacitor, means for charging said capacitor to a predetermined voltage $E_A$, means for connecting said resistor and capacitor to provide a voltage $E_O$ therefrom equal to $E_A e^{-t/RC}$, where $E_A$=said predetermined voltage, $e$=the natural logarithm, $t$=time measured from a predetermined reference time, R=the value of said resistor and C=the value of said capacitor, said resistor and capacitor having values such that $\lambda=1/RC$ where $\lambda=.693$ divided by the half-life of said radionuclide, R=the value of said resistor and C=the value of said capacitor, means for generating a second signal having a frequency proportional to the amplitude of said voltage $E_O$, frequency-responsive motive means connected to the output of said second signal-generating means, and means connecting said motive means to provide relative motion between said specimen-support means and said radiation-counting means to effect a scan of said radionuclide with said specimen.

References Cited

UNITED STATES PATENTS 3,233,102   2/1966   Packard _____ 250—71.5

RALPH G. NILSON, Primary Examiner

A. L. BIRCH, Assistant Examiner

U.S. Cl. X.R.

250—71.5